United States Patent [19]
Hamrick

[11] 3,793,732
[45] Feb. 26, 1974

[54] METHOD AND APPARATUS FOR INSTALLING HEAVY ELECTRICAL CONDUCTOR LINES IN CONDUITS

[75] Inventor: James Carver Hamrick, Matthews, N.C.

[73] Assignee: Jet Line Products, Inc., Mathews, N.C.

[22] Filed: July 29, 1970

[21] Appl. No.: 59,244

[52] U.S. Cl. .......................... 33/137 R, 254/134.4
[51] Int. Cl. ....................... G01b 3/10, B65h 59/00
[58] Field of Search......... 33/137 R, 138; 254/134.4

[56] References Cited
UNITED STATES PATENTS

| | | | |
|---|---|---|---|
| 2,930,584 | 3/1960 | Hensley et al. | 254/134.3 |
| 3,301,531 | 1/1967 | Corsigla | 254/134.4 |
| 1,154,390 | 9/1915 | Foster | 33/138 |
| 3,409,988 | 11/1968 | Zelnick | 33/137 R |
| 3,179,375 | 4/1965 | Hamrick | 254/134.4 |

Primary Examiner—Louis R. Prince
Assistant Examiner—Steven L. Stephan
Attorney, Agent, or Firm—Parrott, Bell, Seltzer, Park & Gibson

[57] ABSTRACT

A novel light-weight plastic tape with measuring indicia thereon is propelled through an electrical conduit by fluid pressure therein, and the indicia on the tape is noted at opposite ends of the conduit to determine the desired length of a conductor line to be installed in the conduit. Thereupon, the tape is used to pull a strong pull line or rope through the conduit, a heavy conductor line of the desired pre-cut length thus determined then is attached to the strong pull line, and the pull line is used to pull the conductor line into the conduit so that the conductor line then extends throughout the length of the conduit.

8 Claims, 6 Drawing Figures

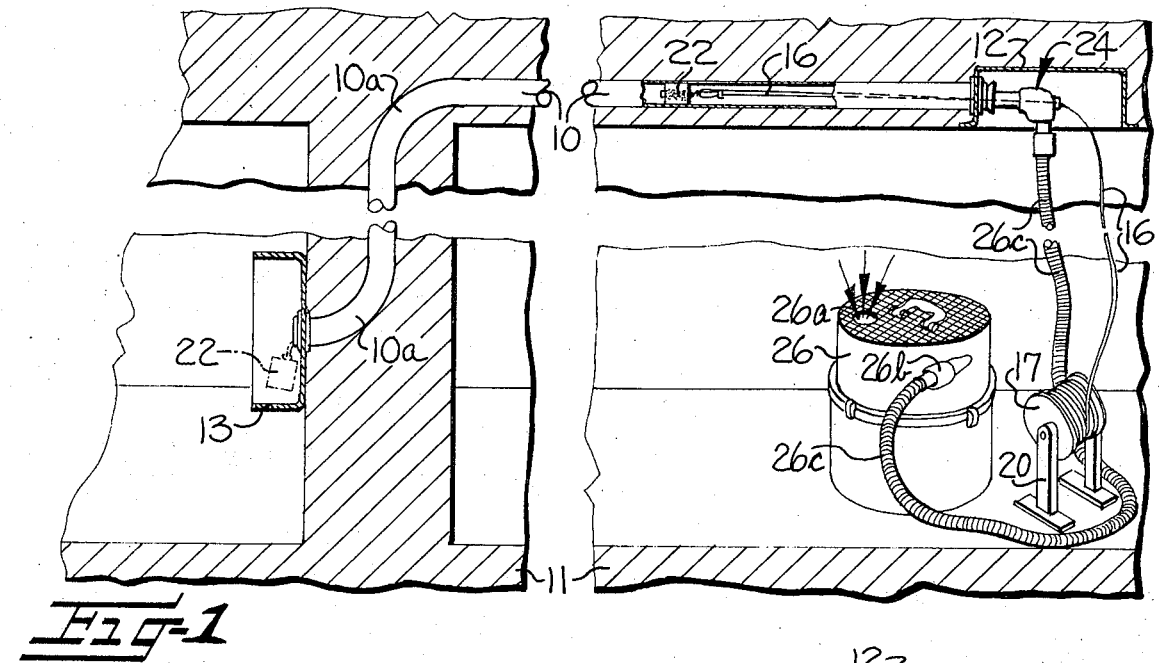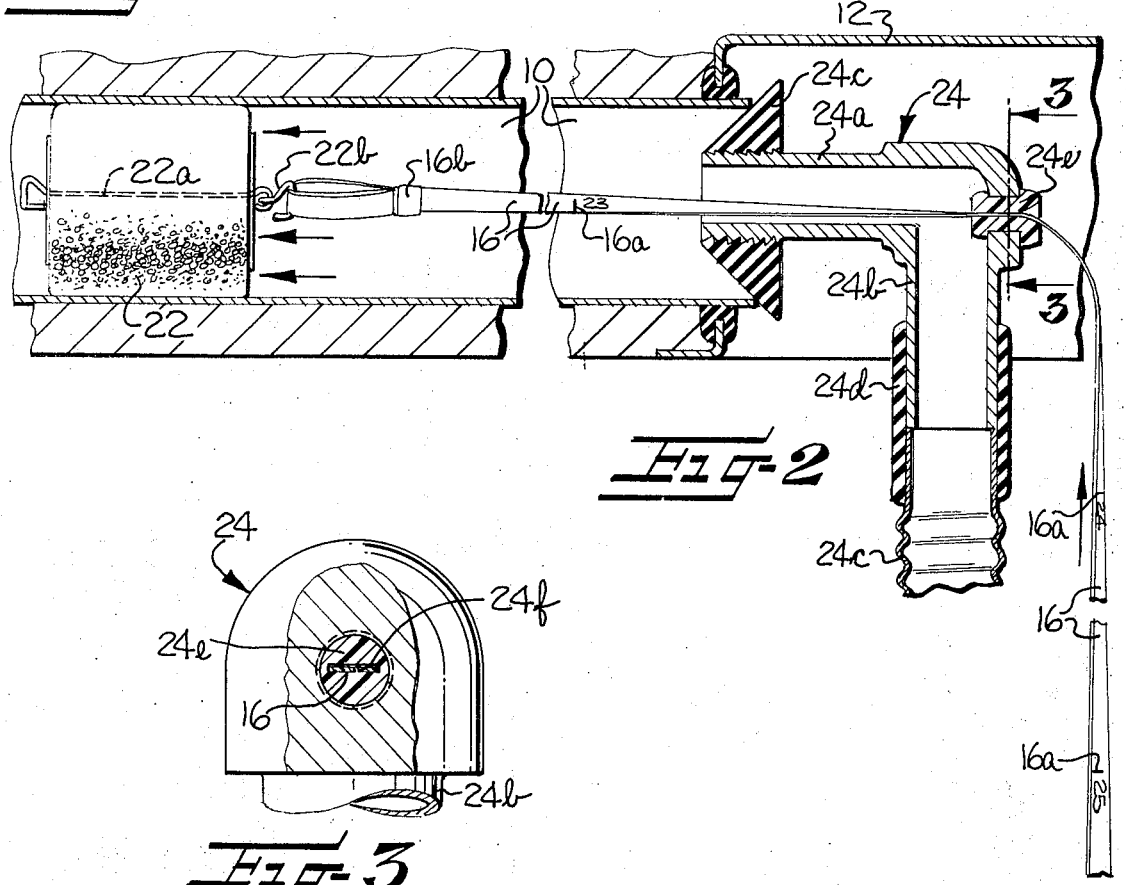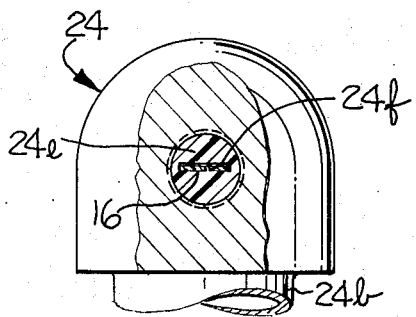

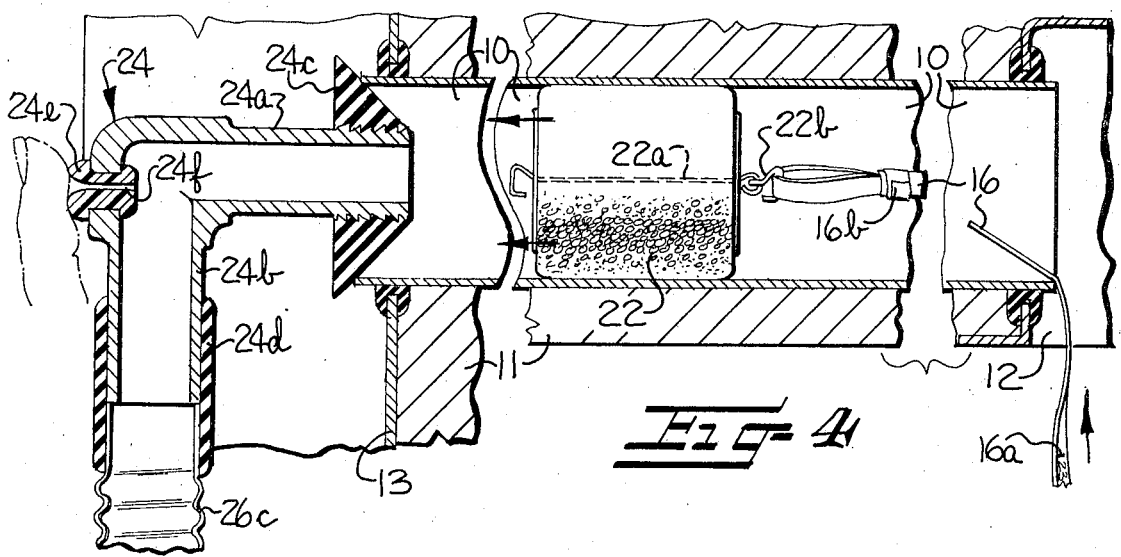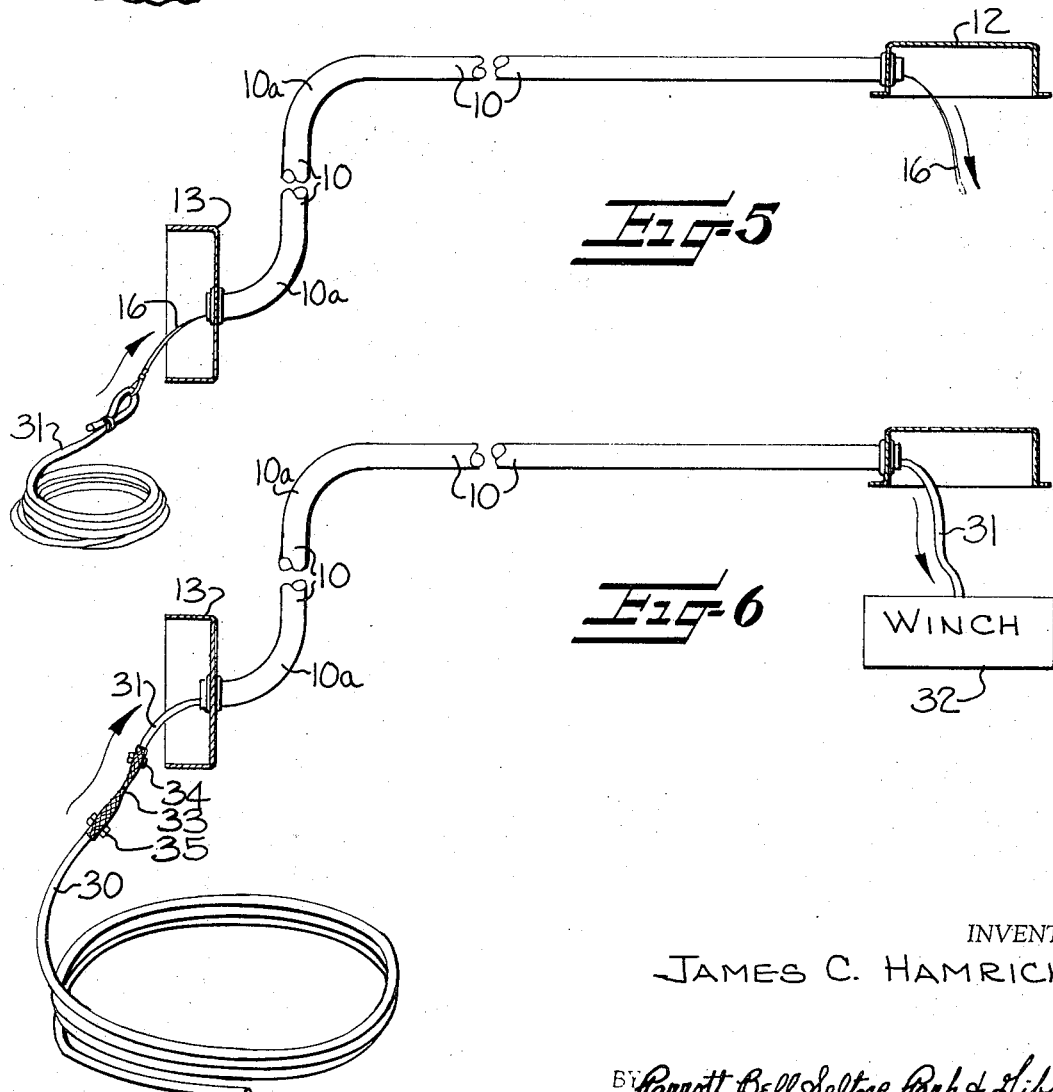

METHOD AND APPARATUS FOR INSTALLING HEAVY ELECTRICAL CONDUCTOR LINES IN CONDUITS

This invention relates to a light-weight plastic tape with measuring indicia thereon and the method of utilizing this tape to facilitate obtaining the length of a conduit and the subsequent installation therein of a corresponding length of heavy conductor line. The light-weight nature of the tape and the physical characteristics thereof readily permit passing the tape through a conduit, with minimal frictional conditions, by securing the leading end of the tape to a carrier plug and utilizing differential fluid pressure acting upon the carrier plug to suck or blow the carrier plug through the conduit. As is well known, this differential fluid pressure is conventionally obtained by utilizing a portable vacuum cleaner with either the air inlet or blowing side of the cleaner communicatively connected to one end of the conduit to act upon the carrier plug to be passed therethrough.

As indicated earlier, this invention is particularly directed to facilitating the installation of heavy conductor lines in a conduit. Such heavy conductor lines have, for some time, been brought to the job site from a supplier in pre-cut lengths corresponding to the length of the conduit in which the same is to be installed. This practice has evolved due not only to the bulky nature of such conductor lines and the difficulty of handling the same in large reels, but also due to the pilferage and theft problems on any construction job, bearing in mind that such heavy conductor lines cost from about $2.50 to about $10.00 per foot.

Heretofore, it has been the practice to obtain a heavy conductor line of the desired pre-cut length by passing a heavy rope through the conduit and cutting or marking the rope, withdrawing the same from the conduit and then sending the rope to a supplier of conductor line. Such rope has conventionally been introduced into a conduit by one of two techniques, namely by pushing a rigid, flexible fish tape through the conduit and utilizing the fish tape for pulling the rope into the conduit, or by passing a pull line through the conduit and utilizing the pull line to in turn pull the heavy rope therethrough. After the pre-cut length of conductor line has been delivered to the job site, a fish tape, or pull line, is again passed through the conduit to in turn pull another heavy rope into the conduit, which rope is then secured to the heavy conductor line for pulling the same into and through the conduit by means of a suitable winch. To avoid the necessity of introducing a measuring rope and subsequent withdrawal of the cut or marked rope for obtaining a corresponding length of conductor line according to this invention the plastic tape with measuring indicia thereon is utilized, which tape may be readily passed through a conduit by differential fluid pressure, in a similar manner as cordage pull lines that have been used heretofore to pull measuring ropes therein. Upon passing the tape of the instant invention through the conduit and determining from the indicia thereon the length of the conduit, such information can readily be furnished to the supplier of conductor line, while at the same time, the tape can be left in the conduit to subsequently be used for pulling a heavy rope therethrough to which the pre-cut conductor line is subsequently attached for being positioned in the conduit.

While it is known in the prior art, as disclosed in my commonly assigned U.S. Pat. No. 2,930,584, to provide a counter in association with the introduction of a pull line into a conduit for obtaining a measurement of the length of the conduit, such practice has not been commercially successful since the power needed to operate the counter relies upon the power source pulling the leading end of the pull line through the conduit. In my aforementioned patent, a punctured carbon dioxide cartridge is passed through the conduit and acts as a self-propelled projectile for not only passing the pull line through the conduit but also operating the counter. The difficulty of stopping the projectile at the exit end of the conduit to avoid a false readout on the counter, and the attendant back-lashing or overriding of the counter mechanism, has presented many problems in obtaining a correct read-out of the length of the conduit. Furthermore, it has been determined that the vacuum cleaners conventionally utilized today on a job site do not have sufficient power to pass a carrier plug attached to a pull line through a conduit and at the same time operate a counter in conjunction with the pull line, particularly where the conduit is of long length and/or has a number of bends therein.

With the foregoing in mind, it is the primary object of this invention to provide a light-weight plastic tape with measuring indicia thereon which may be readily introduced through a conduit by differential fluid pressure to facilitate obtaining a pre-cut length of conductor line corresponding to the length of the conduit and which tape may also be utilized for pulling a heavy rope through the conduit, which rope in turn is utilized for pulling the heavy pre-cut conductor line therethrough.

According to the invention, the plastic tape preferably is made from polypropylene and is characterized by having sufficient flexibility to permit the same to flex readily and pass through any bends in the conduit, but having sufficient cross-sectional stiffness to retain its width dimension to avoid being bowed into conforming relation to the transverse curvature of the conduit. Further, the tape is characterized by having sufficient longitudinal flexibility or pliability to prevent the tape from being pushed through a conduit without folding upon itself, but having sufficient longitudinal stiffness to cause the tape, when released from a flexed or bowed condition, to substantially return to its original unflexed condition.

It is another object of this invention to provide a method of facilitating the determination of the required length of a relatively heavy pliable electrical conductor line for installation thereof in a conduit of substantial length, the method including the steps of attaching the leading end of the thin plastic tape with its measuring indicia thereon to a carrier plug, inserting the carrier plug into the entrance end of the conduit with the tape trailing therefrom and then subjecting the carrier plug to a differential pressure to pass the same through the conduit and out of the exit end thereof so as to position the plastic tape within and throughout the length of the conduit, whereupon the difference between the measuring indicia on the leading end of the tape and the trailing portion of the tape extending from the entrance end of the conduit is noted to determine the desired length of an electrical conductor line subsequently to be installed in the conduit.

Still another object of this invention is to provide a method of the character last described wherein, after the desired length of an electrical conductor line has been determined, an electrical conductor line of about the determined length is cut from a supply thereof to provide a pre-cut length of electrical conductor line. Thereupon, one end of a strong pull line or rope of greater strength than the tape is attached to the tape extending through the conduit, the tape is withdrawn from the conduit to position the pull line therein, one end of the pre-cut length of electrical conductor line is attached to one end of the pull line, and the pull line is withdrawn from the conduit to position the pre-cut electrical conductor line therein.

Some of the objects of the invention having been stated, other objects will appear as the description proceeds when taken in connection with the accompanying drawings, in which FIG. 1 is a fragmentary elevation of the inside of a building, partially in section, illustrating one step in the method of this invention wherein a blowing air stream is utilized for creating differential fluid pressure in a conduit to propel the length of the plastic tape of this invention through the conduit;

FIG. 2 is an enlarged fragmentary, longitudinal sectional view through the conduit and an associated adapter shown in the upper right-hand portion of FIG. 1, and particularly illustrating how the plastic tape is introduced into the entrance end of the conduit through the adapter;

FIG. 3 is an enlarged fragmentary vertical sectional view taken substantially along line 3—3 in FIG. 2;

FIG. 4 is a view similar to FIG. 2 but showing the adapter as used for applying suction to one end of the conduit (the left-hand end in FIG. 1) as an alternative to introducing blowing air into one end of the conduit as shown in FIG. 1;

FIG. 5 is a schematic view illustrating another step in the method of this invention following either of the steps of FIGS. 1 and 4, and showing the plastic tape with opposite ends thereof projecting out of the conduit, and a strong pull line or rope connected to one end of the plastic tape preparatory to withdrawing the tape to pull the strong pull line or rope into and through the conduit; and FIG. 6 is a view similar to FIG. 5 illustrating still another step in the method of this invention, and particularly showing the strong pull line or rope now installed in the conduit, with one end thereof connected to a winch, and the other end thereof connected to a precut length of conductor line preparatory to the conductor line being pulled into and thus installed in the conduit by pulling the strong pull line or rope out of the end of the conduit remote from the pre-cut conductor line.

Referring more specifically to the drawings, the invention is concerned with a novel method of and a device for facilitating the determination of the required length of a relatively heavy pliable conductor line, and the installation thereof, in a conduit such as that indicated at 10 in FIG. 1. Conduit 10 is of substantial length and is stationarily mounted in the structure of a building 11. Throughout the major portion of its length, a typical conduit may be embedded in the structure of the building or otherwise obstructed from view, as shown.

Conduit 10 may have a plurality of right-angular bends 10a therein with open opposite ends of the conduit communicatively connected to wall receptacles or junction boxes 12, 13. By way of example, junction box 12 is shown embedded in the lower portion of and facing downwardly form an upper wall, ceiling, or floor of the building structure, and junction box 13 is shown secured to the vertical face of a column or wall of the building structure.

The device facilitating measurement of the length of the conduit and installation of a heavy conductor line in the conduit, according to this invention, comprises a light-weight elongate tape 16 of plastic material. The tape is characterized by having sufficient flexibility to permit the tape to readily flex and pass by any of the bends 10a in the conduit 10, but has sufficient cross-sectional stiffness to retain its width dimension and to avoid bowing of the same into conforming relation to the transverse curvature of the conduit 10 while also having sufficient longitudinal felxibility to prevent the tape from being pushed through a conduit without folding upon itself, but sufficient longitudinal stiffness to cause the tape, when released from a flexed condition, to substantially return to its original unflexed condition. Accordingly, the tape is preferably made from a polypropylene plastic material which not only has the foregoing characteristics but which provides the tape with smooth faces having a relatively low coefficient of friction. The tape is of thin, flat, cross-sectional form with a thickness of about 0.010 inch and a width of about one-half inch; i.e., about 50 times the thickness of the tape. The tape 16 is provided with graduated measuring indicia or markings 16a spaced along its length on at least one of the flat faces thereof. Preferably, the measuring indicia is in the form of markings spaced about one foot apart from each other throughout the length of the tape and provided with corresponding series of numbers imprinted on the tape so that the distance between certain indicia may be readily determined by visual reference thereto.

The tape 16 is preferably of about 200 pounds breaking strength and is preferably obtained from a supplier wound in the form of a wound package mounted on a reel or drum 17 (FIG. 1). The reel 17 may be supported on a suitable reel stand 20 which may rest upon the building floor or other underlying structural support during withdrawal of the tape 16 therefrom.

Tapes of lesser strength; i.e., about 80 pounds breaking strength, may be used, in some instances, for carrying out the method of this invention. However, from the standpoint of safety and utility, it is preferred that the tape has a breaking strength of about 200 pounds because it is used to pull ropes of various sizes and up to 1 inch or more in diameter through conduits. Also, it is not unusual for the tape to be sheared inwardly from either or both longitudinal edges thereof by burrs on the inner surface of a conduit, particularly in angular bends thereof formed of metal, when it is being used to pull a rope into a conduit. Thus, the tape should be of such strength as to provide a safety factor ensuring that a thus partially sheared tape will still have sufficient strength to pull the rope through the conduit.

The method according to this invention is particularly concerned with the installation of heavy multi-wire conductor lines in conduits, which conductor lines may be up to one inch to three inches or more in diameter. Such conductor lines are quite expensive to the electrician; i.e., such heavy conductor lines cost from about $2.50 to about $10.00 or more per foot. Accordingly, it is very important that the length of each conduit is determined within relatively close limits so that the required pre-cut length of conductor line may be obtained from a supplier and very little, if any, of the conduit will necessarily become wasted when electrical equipment subsequently is being connected to the ends of the installed pre-cut conductor line. Also, in the event of a pre-cut length of conductor line being shorter than the conduit as the result of failure to obtain the correct length of the conduit within relatively close limits, if such a foreshortened conductor line were to be installed in the conduit, it would then become necessary to remove the conductor line from the conduit, which is a very arduous and time consuming task, notwithstanding the fact that such foreshortened length of conductor line might not be of sufficient length to be used in any other conduits on the job site, and may then become waste.

Therefore, according to the invention, the leading end of the plastic tape 16 is attached to a carrier plug 22 which is then inserted into the entrance end of the conduit 10 with the tape trailing therefrom, whereupon the carrier plug is subjected to differential fluid pressure within the conduit to pass the same through the conduit and out of the exit end thereof so that the attached tape is positioned within and extends throughout the length of the conduit.

To facilitate subjecting the carrier plug 22 to differential fluid pressure, in the embodiment of FIGS. 1 and 2, means are provided for introducing a blowing air stream into the entrance end of the conduit 10, which entrance end in this instance, is that end of the conduit connected to the receptacle or junction box 12 of FIGS. 1 and 2.

As best shown in FIG. 2, the means for introducing a blowing air stream into the entrance end of the conduit 10 comprises a portable vacuum cleaner 26 provided with an air inlet 26a and an air outlet 26b. The air outlet 26b is connected to the entrance end of conduit by means of a manually manipulated, hollow, open-ended adapter 24 shown as being in the form of a right-angular pipe fitting or pipe elbow having two intercommunicating and relatively right-angularly disposed tubular legs 24a, 24b thereon. The tubular leg 24a of adapter 24 has a frusto-conically shaped, annular sealing member 24c on its free end whose larger diameter is substantially greater than the internal diameter of the entrance end of conduit 10. Sealing member is adapted to be held in sealing engagement with the entrance end of conduit 10 by an electrician holding the adapter during the introduction of compressed air from vacuum cleaner 26 (FIG. 1) into the free open end of the leg 24b of adapter 24. Sealing member 24c is preferably made from a resilient material. A flexible hose 26c extends from air outlet 26b in FIG. 1, to the leg 24b of adapter 24. The corresponding end of the flexible hose 26c may be removably connected to leg 24b by a suitable coupling 24d.

To facilitate passing the plastic tape 16 through the leg 24a of adapter 24 in its course from reel 17 into conduit 10, as in FIGS. 1 and 2, a bushing 24e, positioned in the outer wall of adapter 24 substantially in alignment with the tubular leg 24a thereof, is provided with a transverse tape confining slot 24f therethrough of substantially the same configuration as the cross-sectional configuration of tape 16. Slot 24 should be only sufficiently larger than tape 16 to ensure that it may pass freely through slot 24f and so that the air stream through adapter 24 will not escape through slot 24f during passage of the tape 16 therethrough.

After the leading end of plastic tape 16 has been inserted through the confining slot 24f and the corresponding leg 24a of adapter 24, as shown in FIGS. 2 and 3, the leading end of plastic tape 16 is connected to carrier plug 22. To this end, carrier plug 22 has an elongate pin 22a embedded therewithin and disposed substantially along the longitudinal axis thereof. The right-hand or trailing end of pin 22a is provided with a hook 22b thereon through which the leading end of plastic tape 16 is looped, with the free end of the portion of the plastic tape forming the loop being secured to the body of the tape, preferably by means of a piece of adhesive tape 16b or the like, to facilitate quickly releasing the loop and detaching the tape 16 from carrier plug 22 after it has been passed through conduit 10.

The carrier plug 22 may take any desired form, and preferably is in the form of an elongate cylindrical member of flexible and resilient material possessing a high degree of compressibility, being preferably made of elastomeric synthetic foam material, such as polyurethane foam, so that the outer periphery of carrier plug 22 will move in substantially sealing sliding engagement with the inner surface of conduit 10.

With the parts occupying the position shown in FIG. 2, upon the vacuum cleaner being started, the stream of compressed air will then flow into the entrance end of conduit 10 and impinge against trailing surface of carrier plug 22 to blow the same along the conduit 10 while the carrier plug 22 pulls the tape therewith through the slot 24f in adapter 24. As soon as the carrier plug 22 is ejected from the exit end of conduit 10 at receptacle 13, or immediately thereafter, the motion of carrier plug 22 will be stopped and the carrier plug then will simply depend from the open end of the conduit 10 as shown in dotted lines in the left-hand portion of FIG. 1.

Because of the characteristics of the plastic tape heretofore described, the tape 16 will not be encumbered to any material degree by its engagement with the curved inner peripheral surface of conduit 10 since only opposing side edges of the tape actually rub against the inner surface of conduit 10 by virtue of the circular cross-sectional configuration of the interior of the inner surface of conduit 10 and the flat condition of the tape 16. If tape 16 had the characteristics of a cloth measuring tape, for example, it would cling to the inner surface of conduit 10, especially at the bends 10a therein, with such tenacity that carrier plug 22 would become stalled in the conduit or might even break the tape. On the other hand, if the tape was of such stiffness that it could be pushed through the conduit without folding upon itself, as is the case with conventional fish tapes which are one-sixteenth inch thick or more and made from relatively rigid material, then the tape would be too heavy to be passed through the conduit 10 by the pressure of the air stream usually delivered by a vacuum cleaner. Also, such a stiff tape would bind against the walls of the conduit at the bends 10a therein to such an extent that, if a carrier plug were used therewith in the manner heretofore described in connection with the plastic tape 16 of the instant invention, the stiff tape and carrier plug would simply stall within the conduit 10.

The adapter 24 also may be used with the vacuum cleaner 26 of FIG. 1 for inserting the tape 16 through the conduit 10 by suction acting upon the leading end of carrier plug 22. Accordingly, it will be observed in FIG. 4 that the annular sealing member 24c of adapter 24 is being held in sealing engagement with the exit end of the conduit 10 instead of the entrance end thereof. Although not shown, it is obvious that the flexible tube 26c extending from the adapter 24 in FIG. 4 would be connected to the air inlet 26a of the vacuum cleaner 26 instead of the outlet 26b as in FIG. 1. In this instance, the leading end of the plastic tape 16 may be connected to the carrier plug 22 in the same manner as that described with respect to FIG. 2, and obviously, the tape 16 does not extend through an adapter in its course into the entrance end of conduit 10.

Upon the tapered sealing member 24c being held against the exit end of conduit 10 by the electrician, the electrician then may hold a finger over the slot 24f in bushing 24e of adapter 24, as shown in FIG. 4, and the vacuum cleaner 26 (FIG. 1) is started to create a suction air stream within conduit 10 and thus suck the carrier plug 22, with the tape 16 trailing therefrom, through the conduit 10 until carrier plug 22 engages the inner end of leg 24a of adapter 24. Thereupon, the electrician removes adapter 24 from the exit end of conduit 10 and pulls the carrier plug 22 and a short length of the leading end of the tape 16 out of the exit end of conduit 10.

After the plastic tape 16 has been positioned in the conduit 10 either by blowing (FIGS. 1, 2 and 3) or by suction (FIG. 4), the length of tape 16 in the conduit may be cut away from the reel 17 so that the reel and vacuum cleaner 26 may be used at another location to install another length of tape 16 in another conduit, if desired, while the length of tape inserted in conduit 10 may remain positioned therein for any desired length of time. In any event, after the tape 16 has been inserted in conduit 10, with opposing ends of the tape extending out of conduit 10, the measuring indicia on the tape is noted at opposite ends of the conduit and the difference between the indicia on the leading end of the tape and the trailing portion of the tape extending from the entrance end of the conduit is then noted to determine the desired length of an electrical conductor line to be installed subsequently in conduit 10. Such information is then furnished to the supplier of electrical conductor line so that the supplier may cut an electrical conductor line of the length thus determined from a supply thereof to provide a pre-cut length 30 thereof (FIG. 6). Generally, the length of such pre-cut length of electrical conductor line 30 should be somewhat longer than the difference noted between the measuring indicia on the leading end and trailing portion of the tape extending through the conduit 10, to allow for the bends 10a in the conduit 10, and to allow for connection of the conductor line to electrical equipment.

After the difference between the measuring indicia on the leading end of the tape extending from the exit end of conduit 10 and the trailing portion of the tape extending from the entrance end of conduit 10 has been noted to determine the desired length of an electrical conductor line, one end of the tape 16 (the leading end in this instance) is attached to a corresponding end of a relatively strong pull line or rope 31 of greater strength than the tape. Rope 31 may be taken from a suitable coiled supply or reel thereof as shown in the left-hand portion of FIG. 5. The plastic tape 16 may be connected to the corresponding end of the rope 31 by looping the same through a loop formed on the adjacent end of the rope 31. After the plastic tape has been attached to the rope 31, the plastic tape is then withdrawn from the conduit in a direction away from the rope 31, thus pulling the rope into and through the conduit 10 so as to leave a length of the rope extending throughout the length of and outwardly from opposite ends of the conduit 10, as shown in FIG. 6.

There are instances in which the size and weight of a pre-cut length of conductor line, such as that indicated at 30 in FIG. 6, is so heavy and will resist bending to such an extent that up to a 2,000 pound pulling force or greater may be required in order to pull such pre-cut length of conductor line into and through a conduit. Accordingly, for illustrative purposes only, one end of the heavy or strong pull line or rope 31 is shown in FIG. 6 connected to a suitable winch 32 which is shown schematically, since winches of the type used for pulling conductor lines into conduits are well known in the art.

In any event, after the strong pull line or rope 31 has been positioned in conduit 10 with opposing end portions of the rope 31 projecting outwardly from opposite ends of conduit 10, one end of rope 31 is attached to a corresponding end of the pre-cut length of electrical conductor line 30. Thereupon, the rope 31 is withdrawn from conduit 10 in a direction away from conductor line 30 to pull the same into and position the same within conduit 10, with opposite ends of the pre-cut length of conductor line 30 projecting outwardly from opposite ends of conduit 10.

By way of illustration, the corresponding ends of rope 31 and the pre-cut length of electrical conductor line 30 are shown interconnected in the left-hand portion of FIG. 6 by means of a braided tubular member or connector 33, opposing end portions of which have the adjacent end portions of the rope 31 and pre-cut length of conductor line 30 positioned therewithin. As is well known, a braided tubular member, once it has been placed in relatively firm engagement with a round object internally thereof, will more tightly engage such object upon a pulling force being applied thereto away from the object. Accordingly, as the pulling force is applied to the rope 31, the opposing forces acting on corresponding ends of the rope 31 and the pre-cut length of conductor line 30 will tend to tighten the braided tubular connector 33 in engagement therewith. To further insure that the conductor line 30 will not become separated from the rope 31 during the pulling of the conductor line 30 into conduit 10, the braided tubular connector 33 may be secured to the rope 31 and the pre-cut length of conductor line 30 by respective bolts 34, 35 extending therethrough. Of course, after the pre-cut length of conductor line 30 has been installed in conductor 10 in the manner heretofore described, the braided connector 33 may be removed from the corresponding ends of the pre-cut length of electrical conductor line 30 and the rope 31.

It is thus seen that I have provided an improved method utilizing a novel light-weight plastic tape having measuring indicia thereon for determining the length of a conduit and for subsequently installing therein a corresponding length of conductor line, wherein the characteristics of the tape are such that it may be readily passed through the conduit by differential pressure produced by a portable vacuum cleaner, acting on a carrier plug to which the leading end of the tape is attached. One of the outstanding advantages of the tape of this invention is that it is useful not only for readily determining the length of a conduit by the ease with which it is positioned in the conduit to obtain a read-out of the length thereof, but it is equally useful for subsequently pulling a strong pull line or rope into the conduit preparatory to pulling a heavy conductor line into the conduit.

From the foregoing description, it is apparent that lengths of the plastic tape may be positioned in a number of respective conduits at a job site, one after another, either by blowing or sucking the tape into the conduits. Thus, by noting the difference between the measuring indicia on opposite ends of each length of tape projecting from the ends of the respective conduits, and leaving the lengths of tape in the conduits, several pre-cut lengths of conductor line can be ordered from a supplier at the same time. The remaining steps of the method shown in FIGS. 5 and 6 could then be carried out with respect to each conduit after all the pre-cut lengths of conductor line have been delivered to the job site.

In the drawings and specification there has been set forth preferred embodiments of the invention and although specific terms are employed, they are used in a generic and descriptive sense only, and not for purposes of limitation, the scope of the invention being defined in the claims.

I claim:

1. A method of facilitating the determination of the required length of a relatively heavy pliable electrical conductor line and effecting installation thereof in a conduit of substantial length which comprises the steps of providing a wound reel of thin lightweight plastic tape having graduated measuring indicia thereon, attaching the leading end of the tape to a resilient and compressible carrier plug, inserting the compressible carrier plug into the entrance end of the conduit in sealing engagement with the inner surface of the conduit with the tape trailing from the conduit, subjecting the carrier plug to differential fluid pressure to pass the same in sealing sliding engagement through the conduit and out of the exit end thereof to position the attached tape within and throughout the length of the conduit, noting the difference between the measuring indicia on the leading end of the tape and the trailing portion of the tape extending from the entrance end of the conduit to determine the desired length of an electrical conductor line, cutting the trailing portion of the tape extending from the conduit to separate the tape from the remainder thereof on the reel so the reel can then be used with additional conduits, attaching to the tape extending through the conduit one end of a strong pull line of greater strength than the tape, withdrawing the tape from the conduit to position the pull line therein, attaching one end of a pre-cut length of electrical conductor line of about said determined length to one end of the pull line, and withdrawing the pull line from the conduit to position the pre-cut electrical conductor line therein.

2. A method of facilitating the determination of the required length of a relatively heavy pliable electrical conductor line and effecting installation thereof in a conduit of substantial length which comprises the steps of providing a wound reel of thin lightweight plastic tape having graduated measuring indicia thereon, attaching the leading end of the tape to a resilient and compressible carrier plug, inserting the compressible carrier plug into the entrance end of the conduit in sealing engagement with the inner surface of the conduit with the tape trailing from the conduit, subjecting the carrier plug to differential fluid pressure to pass the same in sealing sliding engagement through the conduit and out of the exit end thereof to position the attached tape within and throughout the length of the conduit, cutting the trailing portion of the tape extending from the conduit to separate the tape from the remainder thereof on the reel so the reel can then be used with additional conduits, noting the difference between the measuring indicia on the leading end of the tape and the trailing portion of the tape extending from the entrance end of the conduit to determine the desired length of an electrical conductor line, cutting an electrical conductor line of about said determined length from a supply thereof to provide a pre-cut length thereof, attaching to the tape extending through the conduit one end of a strong pull line of greater strength than the tape, withdrawing the tape from the conduit to position the pull line therein, attaching one end of the pre-cut length of electrical conductor line to one end of the pull line, and withdrawing the pull line from the conduit to position the pre-cut electrical conductor line therein.

3. A method according to claim 2, which includes, prior to attaching the leading end of the plastic tape to the carrier plug, the step of inserting the leading end of the tape through a confining slot in one wall of a hollow, open-ended adapter, and wherein the step of subjecting the carrier plug to differential fluid pressure includes positioning one open end of the adapter in substantially sealing engagement with the entrance end of the conduit, and directing fluid under pressure into the other end of the adapter and through the same into the conduit and against the carrier plug such that the carrier plug pulls the plastic tape through the adapter in its course through the conduit.

4. A method according to claim 2, wherein the step of subjecting the carrier plug to differential fluid pressure comprises applying suction to the exit end of the conduit which suction acts on the leading surface of the carrier plug to suck the same through the conduit.

5. A method of facilitating the determination of the required length of a relatively heavy pliable electrical conductor line for installation thereof in a conduit of substantial length which comprises the steps of providing a wound reel of thin lightweight plastic tape having graduated measuring indicia thereon adjacent the entrance end of a conduit, attaching the leading end of the tape to a resilient and compressible carrier plug, inserting the compressible carrier plug into the entrance end of the conduit in sealing engagement with the inner surface of the conduit with the tape trailing from the conduit, subjecting the carrier plug to differential fluid pressure to pass the same in sealing sliding engagement through the conduit and out of the exit end thereof to position the attached tape within and throughout the length of the conduit, cutting the trailing portion of the tape extending from the conduit to separate the tape from the remainder thereof on the reel so the reel and the remainder of the tape thereon can then be used with additional conduits, and noting the difference between the measuring indicia on the leading end of the tape and the trailing portion of the tape extending from the entrance end of the conduit to determine the desired length of an electrical conductor line.

6. A method according to claim 5, which includes, prior to attaching the leading end of the plastic tape to the carrier plug, the step of inserting the leading end of the tape through a confining slot in one wall of a hollow, open-ended, adapter, and wherein the step of subjecting the carrier plug to differential fluid pressure includes positioning one open end of the adapter in substantially sealing engagement with the entrance end of the conduit, and directing fluid under pressure into the other end of the adapter and through the same into the conduit and against the carrier plug such that the carrier plug pulls the plastic tape through the adapter in its course through the conduit.

7. A method according to claim 5, wherein the step of subjecting the carrier plug to differential fluid pressure comprises applying suction to the exit end of the conduit which suction acts on the leading surface of the carrier plug to suck the same through the conduit.

8. A device adapted to be secured to a carrier plug and passed through an electrical conduit by fluid pressure to determine the length of an electrical conductor line to be subsequently installed in the conduit; said device comprising a lightweight elongate tape of plastic material, said tape being formed of polypropylene plastic material having a relatively low coefficient of friction and being of thin flat cross-sectional form, said tape having a thickness of about 0.010 inch and a width about 50 times greater than the thickness thereof, said tape also having graduated measuring indicia along its length on at least one of the flat faces thereof, and said tape being characterized by having sufficient flexibility to permit the tape to readily flex and pass by any bends in the conduit but having sufficient cross-sectional stiffness to retain its width dimension and to avoid bowing into conforming relation to the transverse curvature of the conduit and having sufficient longitudinal flexibility to prevent the tape from being pushed through a conduit without folding upon itself but sufficient longitudinal stiffness to cause the tape, when released from a flexed condition, to substantially return to its original unflexed condition.

* * * * *